United States Patent [19]
Widmer, II et al.

[11] Patent Number: 5,167,839
[45] Date of Patent: Dec. 1, 1992

[54] FLUID COOLANT CLEANING SYSTEM FOR MACHINE TOOL APPLICATIONS

[75] Inventors: Kemble Widmer, II; George F. Coogan; Bobby L. Heffner; Bryce E. Bairey, all of Gastonia, N.C.

[73] Assignee: H & W Systems Corporation, Kings Mountain, N.C.

[21] Appl. No.: 734,504

[22] Filed: Jul. 23, 1991

[51] Int. Cl.⁵ .............................................. B01D 33/06
[52] U.S. Cl. ...................................... 210/784; 82/149; 82/152; 198/716; 210/168; 210/171; 210/297; 210/402; 210/407; 210/805; 210/806
[58] Field of Search .............. 210/168, 171, 223, 391, 210/393, 400, 402, 407, 408, 409, 410, 295, 784, 297, 805, 806; 198/716; 29/50, 73, 71, 94, 95, 98, 106; 82/117, 147, 152

[56] References Cited

U.S. PATENT DOCUMENTS

| | | | |
|---|---|---|---|
| 1,627,550 | 5/1927 | Bachmann | 210/297 |
| 1,845,024 | 2/1932 | Kivari | 210/161 |
| 1,971,418 | 8/1934 | Lee | 408/34 |
| 2,267,086 | 12/1941 | Dohohue | 210/779 |
| 2,452,674 | 11/1948 | Nenninger et al. | 409/136 |
| 3,206,030 | 9/1965 | Estabrook | 210/97 |
| 4,498,987 | 2/1985 | Inaba | 210/222 |
| 4,643,834 | 2/1987 | Batutis | 210/740 |
| 4,655,937 | 4/1987 | Hendrix | 210/772 |
| 4,657,068 | 4/1987 | Peltz | 165/47 |
| 4,685,361 | 8/1987 | Myers | 210/400 |
| 4,751,006 | 6/1988 | Becker | 210/400 |
| 4,895,647 | 1/1990 | Uchiyama | 210/171 |

OTHER PUBLICATIONS

Filtration Systems Div., Barnes Internationa, Inc.; 814 Chestnut St., Rockford, Il. 61101 (815)964-8661; pp. 1-6.

Primary Examiner—Robert A. Dawson
Assistant Examiner—David Reifsnyder
Attorney, Agent, or Firm—Bell, Seltzer, Park & Gibson

[57] ABSTRACT

An improved conveyor system for machine tool cleaning applications comprises a sump internal to a machine tool, a recirculating system in fluid communication with the sump, a hinge belt conveyor, portions of which are interposed between the sump and the recirculating system for removing coarse solids from the fluid, and a fine filter interposed between the sump and the recirculating system for removing fine solids from the fluid.

21 Claims, 3 Drawing Sheets

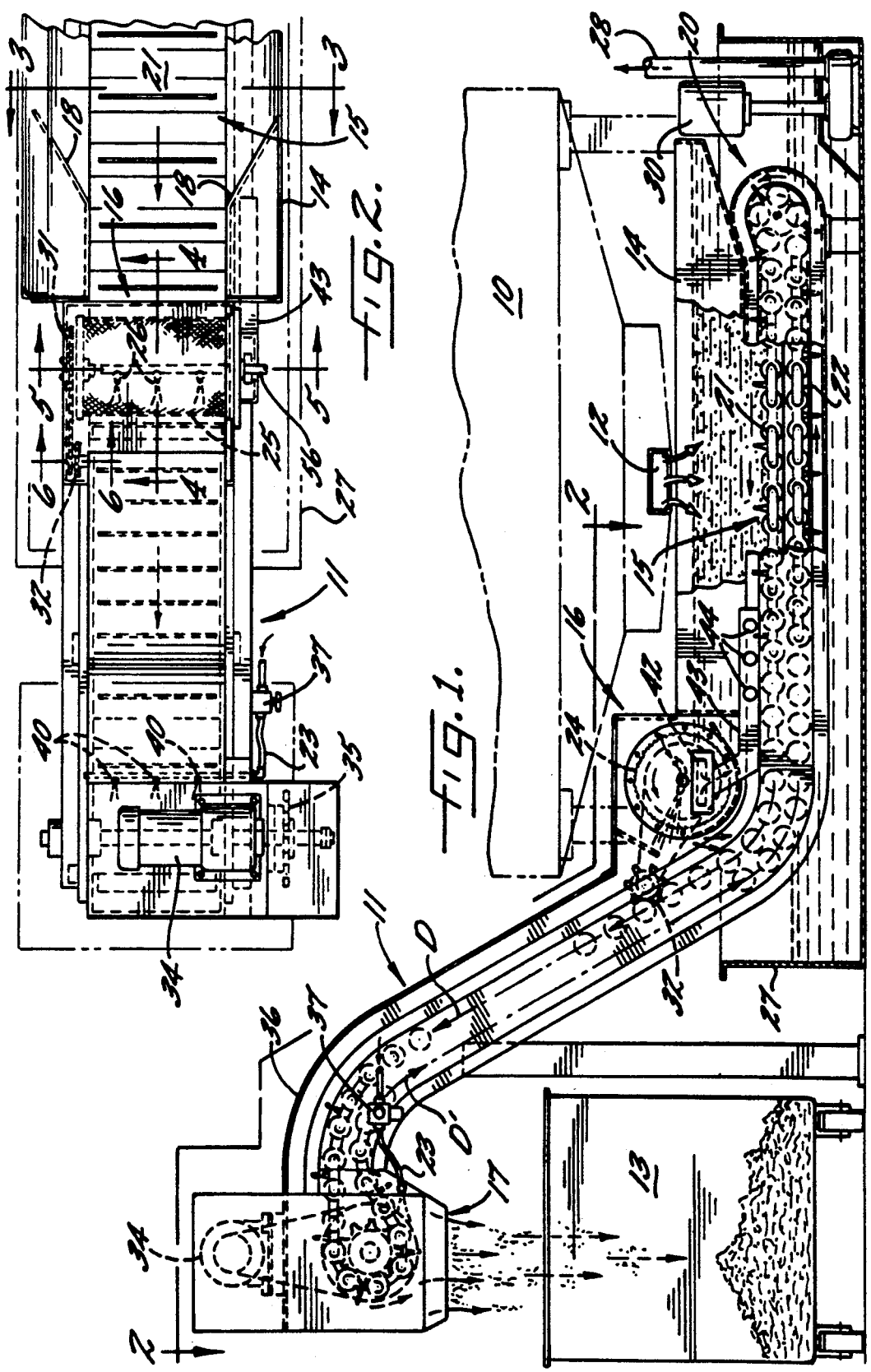

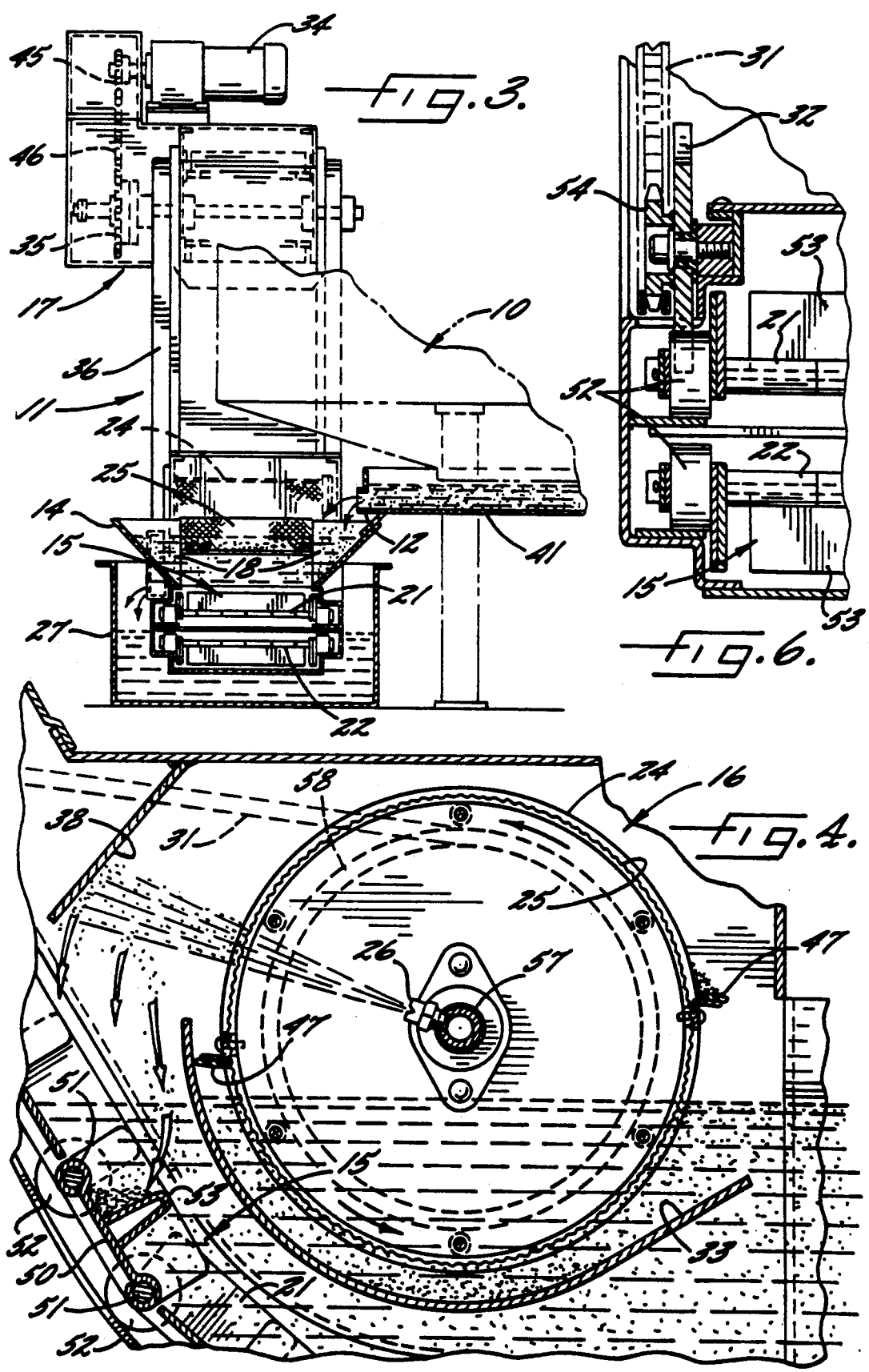

FLUID COOLANT CLEANING SYSTEM FOR MACHINE TOOL APPLICATIONS

FIELD OF THE INVENTION

The present invention relates to fluid coolant cleaning systems for use in conjunction with machine tool applications such as machining centers or lathes, and particularly relates to a improved combination of a machine tool, a conveyor, and a fluid filtering system for metal-working machine tools.

BACKGROUND OF THE INVENTION

The use of machine tools such as lathes or machining centers typically results in the creation of waste material that desirably should be removed from the object being machined. As used herein, a machining center is a device in which a workpiece, typically a metal object, is held stationary while the cutting portions of the machine tool move around the workpiece to cut and form it into the desired shape or pattern. The term lathe generally refers to a device in which the workpiece rotates while a tool is applied to it. Other types of machine tools can be considered to basically comprise combinations of these two techniques.

In every such case, the metal that is removed from the workpiece is generally removed in rather small pieces that historically have been referred to as chips or coarse solids.

As would be expected, because of the work done by the machine tool on the workpiece the cutting process also creates heat. Accordingly, machine tools such as lathes and machining centers also generally incorporate some sort of cooling system in which a liquid coolant is directed at the workpiece and the appropriate parts of the tool, and then drained from the tool. Because of the expense and usefulness of the coolant, it is generally recaptured and recirculated for further use. As part of the recirculating process, the solid materials generated during the cutting process must be removed from the coolant before it can be recirculated and reused. Historically, such chip material (most often a metal) has been of such a size and density that it would settle out of a fluid relatively quickly. Thus, machine tools generally included sumps to which the coolant and chips it contained were directed. The chips settled to the bottom of the sump, or to a conveying mechanism of some type, from which they could be removed in ordinary fashion.

More recently, extremely high speed tool cutting processes have been developed. For example, spindle speeds presently reach 12,000 rpm or greater. Such high speeds beneficially result in faster processes, higher accuracy in the finished workpiece, and superior surface finishes. As a side effect, however, higher speed processes tend to generate extremely fine solid material rather than the coarse materials typically and previously produced in machining centers and lathes. For example, solid materials as small as 0.005"×0.010"×0.020" are typically formed by such newer processes.

Along with higher speeds, the use of lighter (i.e. less dense) alloys is increasing geometrically in this field. When the high speeds and increased accuracy that produce extremely fine solid materials are combined with the lighter alloys, the result is an extremely fine solid material that does not tend to sink from a fluid, but rather floats in it. As stated above, although coarse chip material typically sinks in fluid in a sump where it can be carried off by any convenient mechanism, the fine materials tend to float or "swim" in the coolants. For example, even though most metal particles will eventually settle out of a liquid coolant, the residence time period required for them to do so will be excessive. The practical effect is that these particles must be treated as always floating. Typical sump cleaning devices and methods fail to remove the majority of these fine particles.

Additionally, the lighter alloys often include metals such as aluminum, titanium and magnesium, so that magnetic removal systems that are useful with iron-containing or other magnetically responsive metals or alloys are often useless at removing the fine solids of these lighter alloys.

This raises a number of problems. First, if the extremely fine material is recirculated with the coolant it has obvious detrimental effects on the further cutting processes of the tool. These negative effects include less desirable finishes, relatively poor accuracy, higher wear on the tool, and marred workpieces. The stray chips can also clog fluid lines and valves, thus restricting flow to the workpiece. This reduces the effect of the coolant, and increases the temperature of the workpiece, as well as lowering the lubrication to the tool.

The stray solids can also jam the valves of automatic wheel balancing units used on some grinding machines. Flushing these fluid lines and valves requires that the machine be removed from its normal working operations. The stray solids thus create the need for more frequent cleaning and increase the downtime of the tool.

As another problem, used or "sour" coolants can react with the solid materials to form compounds that tend to float, or gases that encourage the solids to float as the gases effervesce.

The solids cause additional problems with respect to the machine oil (sometimes referred to as "tramp oil") that is almost always present in some amount in most parts of the tool, including its cooling system. Most oils tend to have a negative static charge, while most solid materials produced by the tool tend to have a positive static charge. The opposite charges result in a natural static attraction between oil and solids. Furthermore, the density of the oils and coolants most commonly used in machine tools is such that the oil tends to float upon the coolant. As a result, the solids tend to float with the oil even when the tool is out of operation, and thus they never sink, and in turn never reach conventional sumps and conveyors.

Additionally, even those fine materials which are not recirculated cause problems in that they occupy a great deal of volume within the coolant system. For example, a typical machine tool sump holds about 50 gallons of fluid. To the extent that this volume is filled by solids, two problems can occur: first, a corresponding decrease in available fluid, forcing less fluid to flow more quickly, thus accelerating the residence time problems. Alternatively, the fluid coolant will simply overflow the system.

These consequences in turn reduce the heat sink effect of the coolant in the sump; stated differently, undesireably warmer coolant is returned to the tool.

As yet another problem, the solids are an ideal breeding ground for anerobic bacteria; i.e. the coolant is warm, there may be little circulation, little or no light, and no oxygen supply to discourage such bacteria. Such bacteria tend to attack and break down the coolant, shortening its operational life. In extreme cases, such bacteria can be persistent enough that the entire machine tool must be sterilized.

In almost all of these cases, the machine tool has to be stopped frequently to address the particular problem, such as removing enough of the fine materials to make sure that enough coolant volume remains for the appropriate cooling purposes. The corresponding "down time" presents a significant disadvantage. In some cases a down time of up to 12 hours is required for cleaning the tool every third or fourth operating day.

Present attempts at solving the problem of additional fine solid materials in the machine tool industry typically comprise the use of separate, stand-alone systems distinct from the machine tool itself. This, however, raises a number of problems. First, the coolant must pass from the machine tool to separate, external devices such as conveyors, filters or coalescors to filter and clean the coolant. Because separate components are required, additional floor space and duplicate drive systems for each individual component are correspondingly required. As is known to those in the machine tool industry, floor space is generally at a premium and therefore such expensive and space consuming auxiliary components are disadvantageous.

A typical solution to the problem is set forth in U.S. Pat. No. 4,895,647 to Uchiyama. Such a device, however, in addition to dictating additional floor space, also requires that all of the coolant be transferred externally from the machine tool to the device, cleaned, and then returned to the machine tool, all in the absence of any leaks or other problems. As might be expected, this raises significant difficulties in the overall process, with accompanying costs and other disadvantages. Perhaps most significantly, devices such as suggested by Uchiyama absolutely require arrangements to prevent any coolant from reaching the sump originally designed for and included within the machine tool.

Furthermore, devices such as that described by Uchiyama that attempt to deal with fine solids generally cannot remove the coarse solids that are still produced during many typical processes. Therefore, the fine solid removal system must still be accompanied by some other system for removing coarse materials.

OBJECT AND SUMMARY OF THE INVENTION

There thus exists the need to incorporate systems for cleaning both coarse and fine solids from fluids such as coolants used in contemporary tool cutting machines and with contemporary desired alloys.

Therefore, it is an object of the invention to provide an improved fluid coolant cleaning system for machine tool cleaning applications. The invention comprises a sump internal to a machine tool for being used in conjunction with the machine tool for receiving fluid such as coolants that are used in the operation of the machine tool and that drain from the machine tool to the sump during operation of the machine tool. The invention provides means in fluid communication with the sump for recirculating fluids from the sump to the machine tool for further use. The invention further comprises a conveyor, portions of which are interposed between the sump and the recirculating means for removing coarse solids that are carried by the fluid from the machine tool and which coarse solids are of the type that predominantly tend to sink in such fluids. Other portions of the conveyor are positioned to carry solids out of fluid communication with the recirculating means so that the coarse solids are not returned to the machine tool with the recirculating fluids. A fine filter is interposed between the solid and the recirculating means. The fine filter removes fine solids from fluids in which are of the type that predominantly tend to float in such fluids so that the fine solids are similarly prevented from returning to the sump or to the machine tool with the recirculated fluids.

In another aspect, the invention comprises a method of removing both coarse and fine solids from the fluid coolant in a machine tool by directing coolant containing both fine and coarse solids to a sump internal to a machine tool and onto upper portions of a conveyor in the sump in which the conveyor has respective upper and lower portions and wherein the upper portions defines a solids removal portion and the lower portion defines a return portion, and wherein the conveyor removes the coarse solids from the coolant. The coolant from which the coarse solids have been removed is then directed to a rotating drum filter with a circumferential filtering surface that removes the fine solids from the coolant and returns the fine solids to the conveyor. The clean coolant is then recirculated to the machine tool.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DESCRIPTION OF THE DRAWINGS

FIG. 1 is an elevational cross-sectional view of an improved system according to the present invention;

FIG. 2 is a top plan view taken along lines 2—2 of FIG. 1;

FIG. 3 is a cross-sectional view taken along lines 3—3 of FIG. 2;

FIG. 4 is a cross-sectional view taken along lines 4—4 of FIG. 2;

FIG. 6 is a cross-sectional view taken along lines 6—6 of FIG. 2.

DETAILED DESCRIPTION

Figure 5:
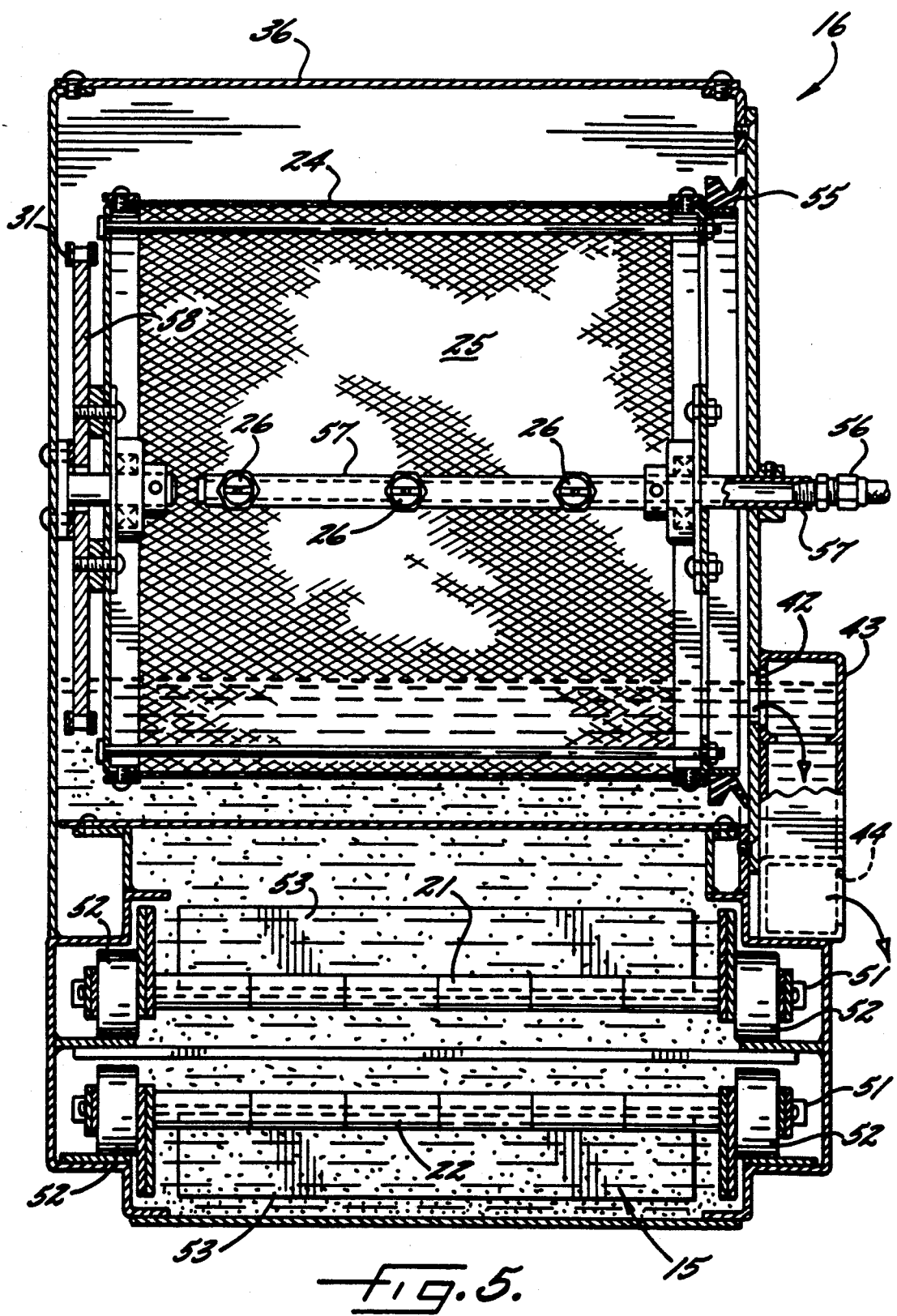
FIG. 5 is a cross-sectional view taken along lines 5—5 of FIG. 2.

FIG. 1 is a cross-sectional view of substantially the entire improved fluid coolant cleaning system of the invention in which lower portions of a machine tool are generally designated at 10 and the improved conveyor system of the present invention is generally designated at 11. As broadly illustrated in FIG. 1, the coolant or other fluid from the machine tool 10 exits lower portions of the machine tool at an opening labeled 12 in the illustrated embodiment. As will be described in more detail herein, all of the fine and coarse solid material carried by the fluid is eventually carried by the conveyor portion of the invention and dumped into a waste area such as the rolling container shown at 13 in FIG. 1.

The machine tool 10 includes a sump 14 into which fluid such as coolant is introduced from the opening 12 in the machine tool 10. One of the advantages of the invention is that the sump 14 is internal to the machine tool 10 and can be used in conjunction with the machine tool for receiving fluid such as coolants that are used in operation of the machine tool and that drain from the machine tool 10 to the sump 14 through the opening 12 during operation of the machine tool.

The invention includes recirculating means in fluid communication with the sump 14 for recirculating fluids from the sump 14 to the machine tool 10 for further use. The recirculating means will be described in more detail later herein, but basically comprises a tank 27, a return pipe 28, and a sump pump 30.

A hinge belt conveyor, broadly designated at 15 has portions that are interposed between the sump 14 and the recirculating means for removing coarse solids that are carried by the fluid from the machine tool 10 and which coarse solids are of the type that predominantly tend to sink in such fluids and in the sump 14. Other portions of the conveyor 15 are positioned to carry solids out of fluid communication with the recirculating means so that the coarse solids are not returned to the machine tool 10 with the recirculating fluids.

It will be understood, however, that other types of conveyors such as magnetic or drag-type conveyors can also be appropriately incorporated into the present invention, and that in such cases the respective directions of movement of upper and lower portions of such conveyors may be opposite those described herein with respect to the illustrated embodiment.

A fine filter broadly designated at 16 is interposed between the sump 14 and the recirculating means for removing the fine solids from fluids in which the fine solids are of the type that predominantly tend to float in such fluids so that the fine solids are similarly prevented from returning to the sump 14 or to the machine tool 10 with the recirculated fluids.

As further illustrated in FIG. 1, the hinge belt conveyor 15 travels in a first direction indicated by the arrows D upwardly from the sump 14 to a first return point generally designated at 17 which is outside of the sump 14. The hinge belt conveyor 15 then returns in an opposite direction indicated by the arrows D' from the first return point 17 downwardly into the sump 14. The hinge belt conveyor 15 continues to travel in the opposite direction D' to a second return point broadly designated at 20 that is within the sump 14. The conveyor 15 then returns in the first direction D through the sump 14 before returning upwardly to the first return point 17.

As further illustrated in FIG. 1, the path of travel of the hinge belt conveyor 15 in sump 14 is generally horizontal with the portions traveling in each direction comprising respective upper 21 and lower 22 portions substantially parallel to one another. The upper portion 21 travels in the first direction D and the lower portion 22 travels in the second direction D' so that coarse solids sinking in the sump 14 tend to impinge and come to rest upon the upper portion 21 and be carried by the upper portion 21 out of the sump 14.

The conveyor system further comprises means at the first return point 17 for dislodging coarse solids from the hinge belt conveyor 15 prior to the return of the hinge belt conveyor to the sump. As illustrated in FIG. 1, in the preferred embodiment the coarse solids dislodging means comprises means for directing an air jet against the hinge belt conveyor and is shown as the air line 23.

In the invention, the fine filter 16 preferably comprises a rotating drum filter 24 that has a circumferential filtering surface 25 (best illustrated in FIGS. 4 and 5) that is positioned between the sump 14 and the recirculating means so that any fluid in the sump 14 that reaches the recirculating means must first travel through the filtering surface 25 and the rotating drum 24. In a preferred embodiment, the filtering surface 25 is a fine mesh screen, but any appropriate surface material can be used, including both consumable and nonconsumable filter materials. Furthermore, the rotating drum filter further comprises means, shown as the spray nozzle 26 (FIG. 4) for backwashing fine solids from the filtering surface 25 and delivering the backwashed fine solids to the hinge belt conveyor 15 so that the conveyor carries the fine solids out of the sump 14 and out of fluid communication with the recirculating means. As best illustrated in FIG. 4, the backwashing means sprays fluid from the interior of the rotating drum 24 to the rear of the filtering surface 25 in order to dislodge fine solids therefrom in the indicated manner. The spray also helps remove solids from the wipers 47 that are described in more detail later herein. In preferred embodiments, the spray nozzle 26 is adjusted to direct the spray at an angle of between about 15° and 20° above the horizontal. The angle improves the trajectory of particles propelled by the spray thereby reducing the possibility that particles will drop between the drum 24 and the weir 33.

It will be understood that other shapes for the drum could be incorporated if desired, such as drums with various polygonal geometries (e.g. a hexagon), without departing from the scope of the claimed invention.

The recirculating means referred to herein preferably comprises a tank 27 that is in fluid communication with the fine filter 16, but separated from the sump 14 and from the hinge belt conveyor 15 by the fine filter 16. The recirculating means also includes a return pipe 28 and a sump pump 30 for pumping filtered fluids from the tank 27 back to the machine tool 10.

As shown in FIG. 1, the rotating drum 24 is driven by a drive belt 31, which can also comprise a chain if desired or necessary. The drive belt 31 is in turn driven by a drive sprocket 32 best seen in FIG. 1. The drive sprocket 32 is in turn driven by the respective flights of the conveyor 15 so that the conveyor 15 drives the rotation of the drum 24. This is an advantage of the illustrated embodiment of the invention in that it eliminates the necessity of a separate drive system for a separate fine filtering system.

Alternatively, a separate drive can be advantageously incorporated if desired to provide a separate speed for the drum than for the conveyor, or could be used to reverse the direction of the drum's rotation in particular applications.

As best illustrated in FIG. 4, the rotating drum filter 24 further comprises a weir 33 in the sump 14 positioned adjacent to the rotating drum 24 so that the majority of fluid flow from the sump to the rotating drum filter is moderated and controlled by the weir 33. The weir 33 also keeps larger particles or groups of particles—often referred to as "stringers" and "bird's nests"—away from the drum surface which they could otherwise damage.

FIG. 4 also illustrates a spray impingment plate 38 that encourages solids backwashed from the rotating drum 24 to drop onto the conveyor 15.

FIGS. 2-6 illustrate additional details of the invention.

FIG. 2 illustrates that the conveyor system is driven by a motor 34 which drives an appropriate sprocket 35 which in turn drives the conveyor 15. In preferred embodiments, the entire conveyor system is encased in a housing 36. FIG. 2 also illustrates that the sump is in an overlying relationship with the recirculating means tank 27. FIG. 2 further illustrates the backwashing spray nozzles 26, three of which are shown in the illustrated embodiment. Additionally, the air jet cleaning means is shown as the air line 23, a valve 37, and three spray jets 40 for directing air against the hinge belt conveyor.

FIG. 2 also illustrates the drive sprocket 32 and the drive belt 31 for the rotating drum filter 24 which are driven by the movement of the conveyor 15 as explained earlier.

FIG. 2 also shows the upper portions 21 of the conveyor 15 as they move in the first direction D from the sump 14 towards the first return point 17.

Additionally, FIG. 2 illustrates a pair of vortex eliminating plates 18 that eliminate dead corners at the point at which coolant fluid enters the drum 24. These plates also increase the fluid velocity to the drum 24 which aids in particle adhesion to the drum surface 25, while at the same time they decrease the build up of material on the outer edges of the weir 33.

FIG. 3 offers a further understanding of the invention. In FIG. 3 the machine tool 10 is shown in a partial cutaway view and includes a small fluid collection area 41 that is in fluid communication with the opening 12 through which coolant, laden with both coarse and fine solids, can exit into the sump 14. As best illustrated in FIG. 3, the upper and lower portions 21 and 22 of the conveyor 15 are in direct fluid communication with the sump 14 so that any solids which will settle in the sump, typically the coarse solids, will settle upon the upper portions 21 of the conveyor 15. It will be understood that if the conveyor comprises a drag-link type of conveyor, the solids would settle to the lower portion for removal.

In conjunction with FIG. 1, FIG. 3 shows the fluid flow path of coolant from the sump 14, through the fine filter 16, and then to the recirculating means. First, with reference to FIG. 1, it will be seen that coolant containing fine particles will impinge upon the filtering surface 25 of the rotating drum 24. The filtering surface traps the fine solid particles while allowing coolant to pass through so that the only coolant which reaches the interior of the rotating drum 24 is coolant that is free of both coarse particles (which typically will have settled but can also be filtered) and fine particles. From the interior of the drum 24, the cleaned fluid coolant exits through an opening 42 and flows through a channel pipe 43 that runs generally alongside the sump 14 and conveyor 15 to openings 44 which allow the clean coolant to enter the recirculating means tank 27. It will thus be seen that while fluid containing both coarse and fine solid materials can enter the sump 14 from the opening 12 in the machine tool 10, only coolant which has been cleared of both coarse solids and fine solids can enter the recirculating mean tank 27.

FIG. 3 also illustrates the motor 34 and the drive sprocket 35 referred to earlier but further illustrates that the motor 34 includes a driving sprocket 45 and a drive belt 46 which together drive the sprocket 35 and then the conveyor 15.

FIG. 4 illustrates additional details of the invention. As described earlier, FIG. 4 shows the rotating drum 24, the filtering surface 25, the backwashing spray nozzles 26, the drive belt 31, and the weir 33. FIG. 4 also illustrates, however, that in a preferred embodiment the drum 24 rotates in a counterclockwise direction (clockwise would be likewise appropriate in other situations) and includes at least one small wiper 47. Two such wipers 47 are illustrated, and travel along the circumference of the drum 24 and in contact with the weir 33 to carry out particles which may have impinged upon the surface 25 but have dropped therefrom to the weir 33. The wipers 47 carry the particles to a point at which they can be cleared from adjacent the surface 25 and dropped onto the conveyor 15. In the illustrated embodiment, the wipers 47 are set at a small angle (15° is an appropriate example) from the perpendicular and rearward to the direction of rotation of the drum 24. The angle decreases the tendency for material to pack in the corner formed by the intersection of the wiper 47 and the drum surface 25.

As one additional advantage, the wipers help in the filtration process by raising and lowering the static head of the fluid, thereby creating a pumping effect and an increased flow rate in the fluid chamber that in turn provides a better scavenging effect on the solids to be removed.

FIG. 4 also illustrates that when particles are removed by the wiper 47 or backwashed by the nozzles 27 and are thus directed away from the drum 24, they may strike the impingement plate 38 where they are in turn directed to fall toward the upper portion 21 of the conveyor 15. This combination greatly enhances the operation and function of the drum 24 by using the conveyor 15 as a means for carrying away fine solids that the drum 24 has trapped. The combination also enhances the operation and function of the conveyor 15 by using it to carry away fine solids that it could not normally trap by itself.

FIG. 4 also illustrates that in the preferred embodiment the conveyor is a hinge belt conveyor formed of individual flights 50 carried by shafts 51 on rollers 52. As further illustrated in FIG. 4, some or all of the flights 50 include a perpendicular portion 53 that assists in trapping material gathered onto the flights 50. The flights 50 can be made of any suitable material, but in preferred embodiments are formed of perforated metal plates.

FIG. 5 illustrates a number of the items already discussed including the housing 36, the rotating drum 25 and the respective upper and lower portions 21 and 22 of the conveyor 15. The upstanding perpendicular portions 53 are also illustrated in FIG. 5 as are the rollers 52 upon which the hinge belt conveyor 15 travels.

FIG. 5 also illustrates the filtering surface 25 of the rotating drum 24 along with the three spray nozzles 26 that backwash the surface 25. The drive belt 31 for the drum 24 is also included as is the opening 42 from the interior of the drum into the channel 43 and then the openings 44 from the channel to the tank 27.

FIG. 6 illustrates in further detail the means by which the conveyor 15 drives the rotating drum 24. In particular, FIG. 6 demonstrates that the rollers 52 on the upper portions 21 of the conveyor 15 engage the sprocket 32 (FIG. 1). The sprocket 32 in turn carries a coaxially mounted second drive wheel (not shown) which in turn drives the belt 31, a drum drive sprocket 58, and then the drum 24 in a manner already described. The remainder of the elements in FIG. 6 are otherwise identical to those already described and thus their descriptions will not be repeated in detail. As stated earlier, however, a drive for the drum that is independent of that of the conveyor may also be incorporated.

As some further points of detail, FIG. 1 shows that the sump pump 30 returns clean fluid from the tank 27 to the machine tool through the return pipe 28. It will be understood by those familiar with such systems that the specific nature and plumbing of such a system is commonly known to those familiar with this art and will not otherwise be repeated or described in detail.

FIG. 5 also shows a annular seal 55 carried by the side of the rotating drum 24 through which the fluid exits through the opening 42. This seal prevents fluid containing solids from entering the interior of the drum other than through the filtering surface 25.

FIG. 5 further illustrates a hose fitting 56 and a pipe 57 for providing a fluid flow path for carrying the coolant from a appropriate pump or the like to the spray nozzles 26. As stated previously, the nature and routes of such plumbing are commonly adaptable by those skilled in the appropriate arts and will not otherwise be described in detail.

It will be further understood that the invention in addition to comprising the improved conveyor system itself, also comprises the combination of a machine tool such as a machining center or a lathe with the improved conveyor system.

In another aspect the invention further comprises a method of removing both coarse and fine solids from the fluid coolant in a machine tool such as a machining center or a lathe and in which the coarse solids are of the type that tend to sink in the fluid coolant and the fine solids are of the type that tend to swim or float in the fluid coolant. The method comprises directing coolant containing fine and coarse solids to a sump internal to the machine tool and onto upper portions of a conveyor in the sump in which the conveyor has respective upper and lower portions. The upper portion defines a solids removal portion and the lower portion defines a return portion so that the conveyor removes the coarse solids from the coolant. The coolant from which the coarse solids have been removed is then directed to the rotating drum filter with the circumferential filtering surface that removes the fine solids from the coolant and returns the fine solids to the conveyor, and the coolant is then recirculated to the machine tool.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A fluid coolant cleaning system for machine tool cleaning applications that is particularly useful for removing both coarse and fine solid materials and materials that may be either responsive or unresponsive to magnetic removal, said system comprising:

a sump internal to a machine tool for being used in conjunction with the machine tool for receiving fluids such as coolants that are used in the operation of the machine tool and that drain from the machine tool to said sump during operation of the machine tool;

means internal to the machine tool in fluid communication with said sump for recirculating fluids from said sump to the machine tool for further use;

a conveyor internal to the machine tool, portions of said conveyor being interposed between said sump and said recirculating means, said conveyor having respective upper and lower portions in said sump for moving in substantially parallel paths to one another and in respective opposite directions, for removing coarse solids that are carried by the fluid from the machine tool and which coarse solids are of the type that predominantly tend to sink in such fluids, portions of said conveyor being positioned to carry solids out of fluid communication with said recirculating means so that the coarse solids are not returned to the machine tool with the recirculating fluids; and a fine filter internal to the machine tool interposed between said sump and said recirculating means for removing fine solids from fluids, in which the fine solids are of the type that predominantly tend to float in such fluids so that said fine solids are similarly prevented from returning to said sump or to the machine tool with the recirculated fluids.

2. A cleaning system according to claim 1 wherein said conveyor travels in a first direction upwardly from said sump to a first return point outside of said sump, returns in an opposite direction from said first return point downwardly into said sump, travels in the opposite direction to a second return point within said sump, and then returns in the first direction through said sump before returning upwardly to said first return point.

3. A cleaning system according to claim 2 wherein the path of travel of said conveyor in said sump is generally horizontal, and wherein said upper portion travels in said first direction and said lower portion travels in said second direction so that coarse solids sinking in said sump tend to impinge and come to rest upon said upper portion and be carried by said upper portion out of said sump.

4. A cleaning system according to claim 2 wherein said first return point further comprises means for dislodging coarse solids from said conveyor prior to the return of said conveyor to said sump.

5. A cleaning system according to claim 4 wherein said coarse solids dislodging means comprises means for directing an air jet against said conveyor.

6. A cleaning system according to claim 1 wherein said fine filter comprises a rotating drum filter having a circumferential filtering surface and positioned between said sump and said recirculating means so that any fluid in said sump that reaches said recirculating means must first travel through said filtering surface and said rotating drum.

7. A cleaning system according to claim 6 wherein said filtering surface comprises a fine mesh screen.

8. A cleaning system according to claim 6 wherein said rotating drum filter further comprises means for backwashing fine solids from said filtering surface and delivering the backwashed fine solids to said conveyor so that said conveyor carries the fine solids out of said sump and out of fluid communication with said recirculating means.

9. A cleaning system according to claim 8 wherein said backwashing means comprises means for spraying fluid from the interior of said rotating drum to the rear of said filtering surface.

10. A cleaning system according to claim 6 wherein said rotating drum is driven by a drive belt, said drive belt is driven by a drive sprocket, and said drive sprocket is driven by said conveyor so that said conveyor drives the rotation of said drum.

11. A cleaning system according to claim 6 wherein said rotating drum filter further comprises a weir in said sump positioned adjacent said rotating drum so that the majority of fluid flow from said sump to said rotating drum filter is moderated and controlled by said weir.

12. A cleaning system according to claim 1 wherein said recirculating means comprises a tank in fluid communication with said fine filter but separated from said sump and said conveyor by said fine filter and a sump pump for pumping filtered fluids from said tank back to a machine tool.

13. A cleaning system according to claim 1 wherein said fine filter further comprises means for returning filtered fine solids to said conveyor for carrying fine solids out of said sump.

14. A cleaning system according to claim 1 wherein said conveyor comprises a hinge belt conveyor.

15. The combination of a machine tool such as a machining center or a lathe with an improved fluid coolant cleaning system for machine tool cleaning applications that is particularly useful for removing both coarse and fine solid materials and materials that may be either responsive or unresponsive to magnetic removal, said system comprising:
  a machine tool;
  a sump internal to said machine tool for being used in conjunction with said machine tool for receiving fluids such as coolants that are used in the operation of said machine tool and that drain from said machine tool to said sump during the operation of said machine tool;
  means in fluid communication with said sump for recirculating fluids from said sump to said machine tool for further use;
  a hinge belt conveyor, portions of said conveyor being interposed between said sump and said recirculating means for removing coarse solids that are carried by the fluid from said machine tool and which coarse solids are of the type that predominantly tend to sink in such fluids, and other portions of said conveyor being positioned to carry solids out of fluid communication with said recirculating means so that the coarse solids are not returned to said machine tool with the recirculating fluids; and
  a fine filter interposed between said sump and said recirculating means for removing fine solids from fluids, in which the fine solids are of the type that predominantly tend to float in such fluids so that said fine solids are similarly prevented from returning to said sump or to said machine tool with the recirculated fluids.

16. A cleaning system according to claim 15 wherein the path of travel of said hinge belt conveyor in said sump is generally horizontal with respective upper and lower portions travelling substantially parallel to one another, and wherein said upper portion travels in a first direction in said sump and then upwardly from said sump to a first return point outside of said sump, and returns in an opposite direction from said first return point downwardly into said sump, and said lower portion travels in the opposite direction to a second return point within said sump, and then returns in the first direction through said sump before returning upwardly to said first return point so that coarse solids sinking in said sump tend to impinge and come to rest upon said upper portion of said hinge belt conveyor and are carried by said upper portion out of said sump.

17. A cleaning system according to claim 16 wherein said fine filter comprises a rotating drum filter having a circumferential fine mesh screen filtering surface and positioned between said sump and said recirculating means so that any fluid in said sump that reaches said recirculating means must first travel through said filtering surface and said rotating drum.

18. A combination according to claim 16 wherein said rotating drum filter is positioned adjacent said hinge belt conveyor and adjacent the portion of the conveyor that travels upwardly from said sump toward said first return.

19. A method of removing both coarse and fine solids from the fluid coolant in a machine tool such as a machining center or a lathe, and in which the coarse solids are of the type that tend to sink in the fluid coolant and the fine solids are of the type that tend to swim or float in the fluid coolant, the method comprising:
  directing coolant containing fine and coarse solids to a sump internal to the machine tool and onto a conveyor in said sump and wherein the conveyor removes the coarse solids from the coolant;
  directing the coolant from which the coarse solids have been removed to a rotating drum filter internal to said machine tool and with a circumferential filtering surface that removes the fine solids from the coolant and returns the fine solids to the conveyor; and
  recirculating the coolant from which the coarse and fine solids have been removed to the machine tool.

20. A method according to claim 19 wherein the step of directing coolant containing fine and coarse solids onto a conveyor comprises directing the coolant onto upper portions of a conveyor that has respective upper and lower portions, and wherein the upper portion defines a solids removal portion and the lower portion defines a return portion.

21. A method according to claim 20 further comprising the step of returning filtered fine solids from the filtering surface to the upper portions of the conveyor so that the conveyor removes the fine solids from the sump.

* * * * *

UNITED STATES PATENT AND TRADEMARK OFFICE
CERTIFICATE OF CORRECTION

PATENT NO. : 5,167,839
DATED : December 1, 1992
INVENTOR(S) : Widmer, II et al.

It is certified that error appears in the above-identified patent and that said Letters Patent is hereby corrected as shown below:

On the title page, Item[56]:
UNDER "OTHER PUBLICATIONS":

"Internationa" should be --International--.

At column 7, line 30, "Which" should be --which--.

At column 7, line 56, "mean" should be --means--.

Signed and Sealed this

Twelfth Day of October, 1993

Attest:

BRUCE LEHMAN

*Attesting Officer*   *Commissioner of Patents and Trademarks*